Feb. 27, 1940.   T. R. SCOTT ET AL   2,191,995
HIGH TENSION ELECTRIC CABLE
Filed April 22, 1936   6 Sheets-Sheet 1
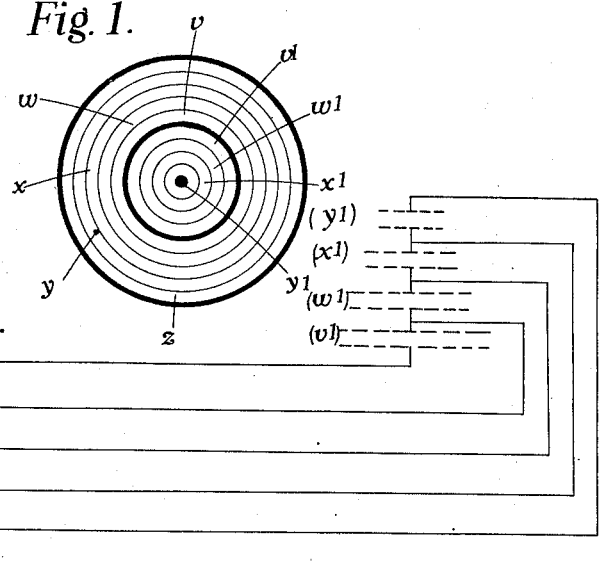
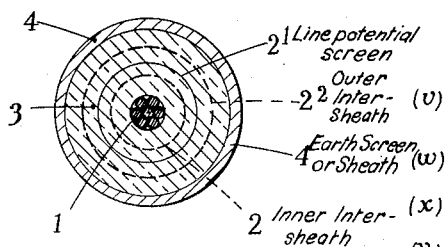
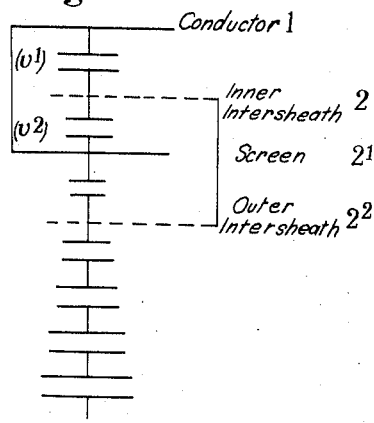
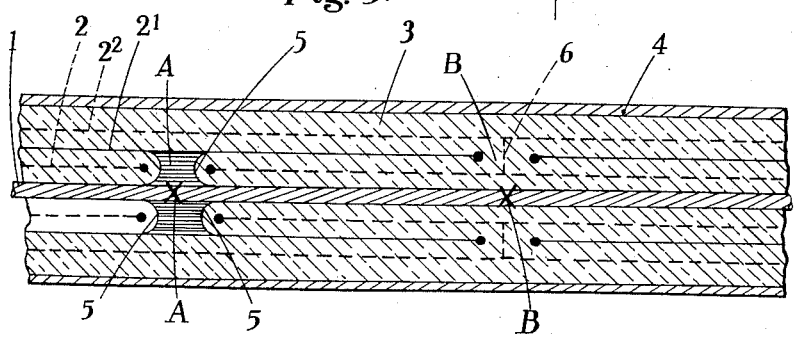
INVENTORS
T. R. SCOTT
R. C. MILDNER
BY R. C. Hopgood
ATTORNEY Feb. 27, 1940.  T. R. SCOTT ET AL  2,191,995
HIGH TENSION ELECTRIC CABLE
Filed April 22, 1936   6 Sheets-Sheet 2

INVENTORS
T. R. SCOTT
R. C. MILDNER
BY R. C. Hopgood
ATTORNEY

INVENTORS
T. R. SCOTT
R. C. MILDNER
BY R. C. Hopgood
ATTORNEY

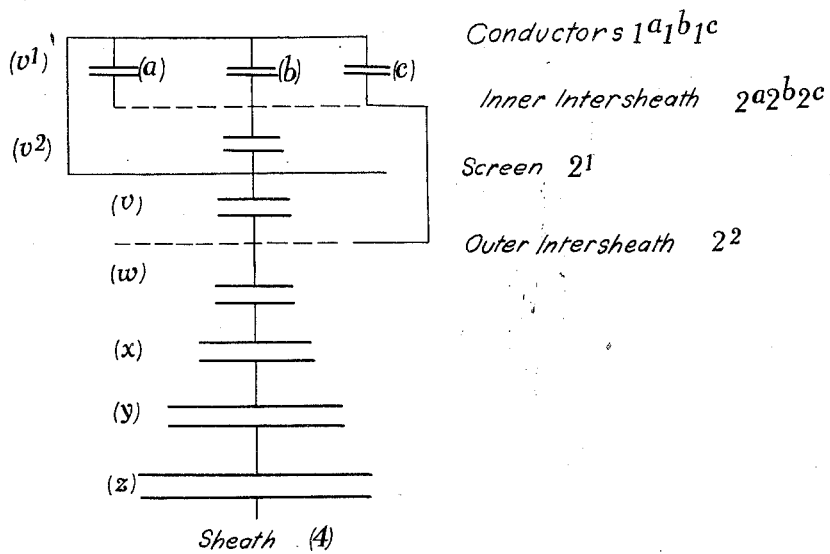
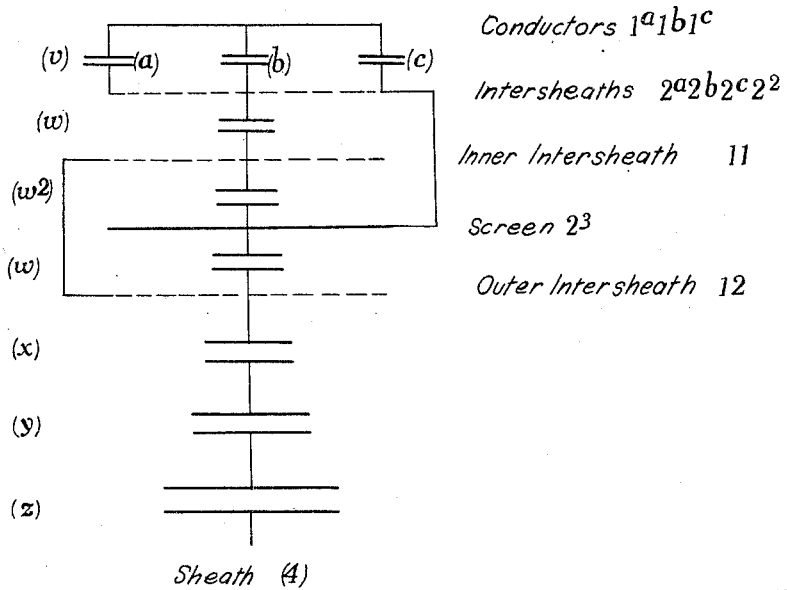

Feb. 27, 1940.  T. R. SCOTT ET AL  2,191,995
HIGH TENSION ELECTRIC CABLE
Filed April 22, 1936    6 Sheets-Sheet 5
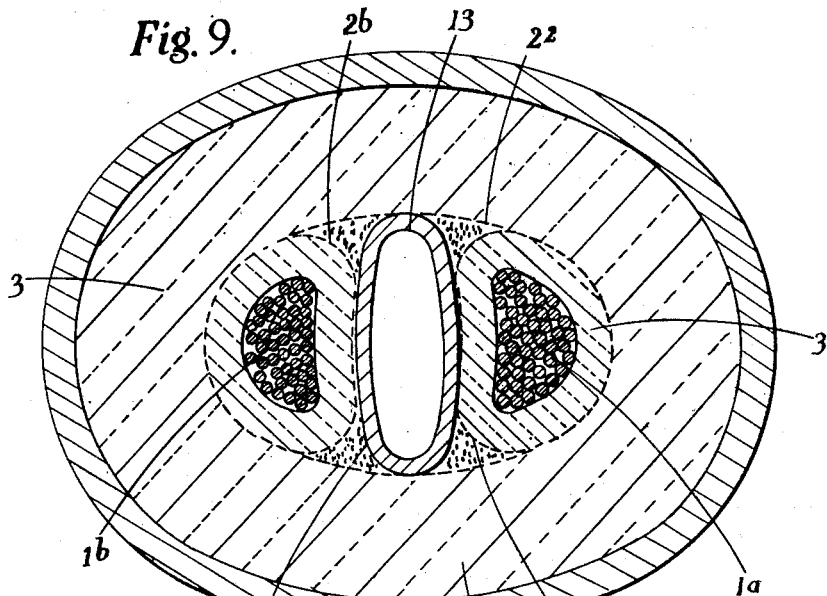
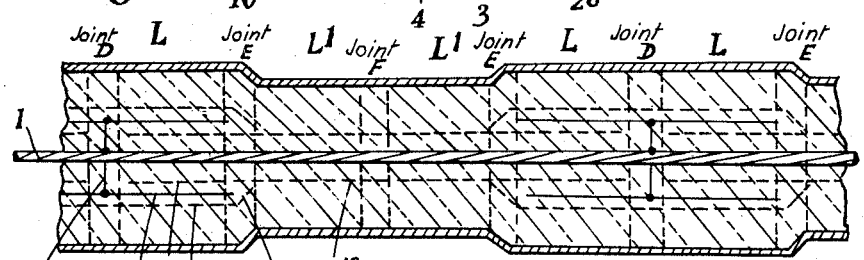
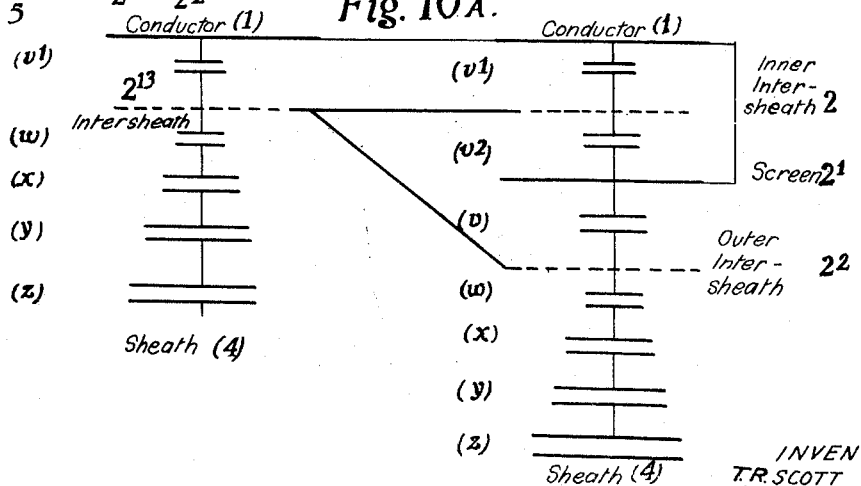
INVENTOR
T. R. SCOTT
R. C. MILDNER
BY *R. C. Hopgood*
ATTORNEY Patented Feb. 27, 1940

2,191,995

UNITED STATES PATENT OFFICE 2,191,995

HIGH TENSION ELECTRIC CABLE

Thomas Robertson Scott and Raymond Charles Mildner, London, England, assignors to International Standard Electric Corporation, New York, N. Y.

Application April 22, 1936, Serial No. 75,710
In Great Britain August 19, 1935

3 Claims. (Cl. 174—36)

This invention relates to improvements in high tension electric cables.

If the insulation of a power cable be divided up into elementary concentric rings each ring will possess an electrostatic capacity value directly proportional to its radial distance from the centre of the cable. These elementary capacities, known as partial capacities, determine to a very considerable extent the characteristics of the cable. The variation of capacity from the conductor outwards effects a distribution of voltage such that the product of the radial voltage drop multiplied by the electrostatic capacity is a constant for each elementary concentric ring. As a result the electrostatic stress is greatest in the region of the conductor and diminishes as the distance from the conductor increases. The greater the ratio of the values of curvature at the outside of the dielectric to that at the conductor the greater will be the variation of stress across the dielectric, so that in certain circumstances it may be necessary to increase the average stress in order to secure a lower maximum stress by building up the conductor radius to a predetermined figure: this is common practice for the highest voltages or for lower voltages where the conductor diameter is small. In order to secure most favourable maximum stress conditions the ratio of outer and inner radii of the insulation should not exceed 2.718 (e): in these circumstances the average stress is but 58% of the maximum stress. If all the partial capacities were of equal value the radial voltage drop in each elementary concentric ring would be equal and the electrostatic stress would be uniform throughout the insulation. Looked at from one point of view this would result, if the insulation thickness remained unaltered, in a very considerable reduction in the maximum electrostatic stress value in any given cable with resultant increase in the factor of safety in respect of breakdown strength.

It has been proposed to obtain this equalisation of partial capacities by the utilisation of insulating materials of different dielectric constant so that the product of the geometrical factor of each partial capacity multiplied by the dielectric constant is of constant value. This method has never given satisfactory results owing to limitations of known insulating materials and to constructional difficulties.

Again it has been proposed to divide the dielectric into a number of elements by means of metallic intersheaths, the potential across each element being controlled by connecting the intersheath to a transformer or external capacity so as to anchor it at a potential which will ensure that the maximum stress across each section is of the same order. This method is open to objections on account of the complicated transformer windings required in supplying the capacity currents taken by the various intersheaths and on account of the added hazards introduced by the multiplication of transformer tappings. It has not been adopted on any commercial scale.

It has also been proposed to connect in parallel with each partial capacity a condenser or capacity of such value that the resultant value was a constant for each partial capacity and its associated condenser. The theory of such adjustment is exposed in Silbermann's British patent specification 218,279 which discloses a system in which the adjusting condensers or capacities are contained within the hollow conductor of the cable. There are practical difficulties, associated with jointing, which render this method undesirable if the factor of safety of the whole system, including joints, is to be increased. The fundamental difficulty in the joint design is the bringing out of the condenser electrodes from the inside of a tubular conductor carrying heavy current.

The present invention aims to overcome such objections and to provide an improved method of grading the stress resulting in a simple construction of cable suitable for high tension working, and consists in providing means for equalising the partial capacities, or for increasing in value those adjacent to the conductor, within the cable itself but exterior to the main current carrying conductor. This is accomplished according to the invention by the provision of intersheaths and by suitably proportioning the various elements of the cable to obtain the desired capacity grading effect. Another aspect of the present invention consists in providing means for artificially increasing the capacity between the conductor and an equipotential surface or intersheath surrounding the conductor.

According to a feature of this invention, there is provided a high tension cable containing between the conductor and the lead sheath, an intersheath, the potential of which is controlled by a connection to a second or inner intersheath surrounding the conductor and insulated therefrom, the relative diameters of the conductor, the first and second intersheath and the lead sheath being arranged to obtain the required potential. Preferably the capacity of the conductor to the second or inner intersheath is artificially increased, for example by connecting the conductor to a screen interposed between the first and second intersheaths, or by dividing the conductor into a plurality of parts each separately surrounded by a sheath forming the said second or inner intersheath.

A screen at conductor potential may be inserted at a suitable radius between the first and second intersheaths. In an alternative construction the said intersheaths may be in direct contact where the conductor is divided into a plurality of portions each surrounded by a sheath.

In the case where a conductor is divided into a plurality of sections, separately insulated and screened, which sections are laid up and bound by a conducting intersheath layer, the combined capacity of the screened sections in parallel, is designed to throw voltage on to the surrounding belt insulation. As a result, the insulation of the cable is worked more efficiently because the mean stress is raised relative to the maximum stress.

The invention will be better understood from the following description with reference to the accompanying drawings in which:

Fig. 1 represents a known form of cable employing equalising condensers;

Fig. 1A is an explanatory diagram thereof;

Fig. 2 is a cross section of cable showing one arrangement according to the invention;

Fig. 2A is an explanatory diagram thereof;

Fig. 3 is a longitudinal section of cable showing diagrammatically methods of jointing such cable;

Fig. 7A is an explanatory diagram thereof;

Fig. 8A is an explanatory diagram thereof;

Fig. 9 is a section of oval cable constructed according to the invention;

Fig. 10 is a longitudinal section showing a composite arrangement of cable and joints;

Fig. 10A is an explanatory diagram thereof;

Similar reference characters are used for corresponding parts throughout the drawings.

Figure 4:
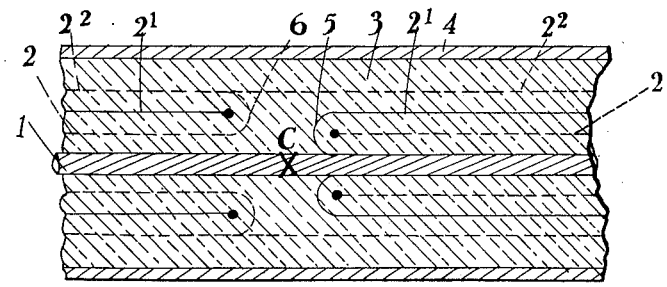
Fig. 4 is a longitudinal section of cable showing another method of jointing.

In the known system of Silbermann's British patent specification 218,279, shown in Fig. 1 of equalising partial capacities concentric condensers $v'$, $w'$, $x'$, $y'$ of diminishing capacity value as the mean potential of the condenser diminishes, are enclosed in the tubular conductor of the cable and are connected at joints to intersheaths forming partial capacities $v$, $w$, $x$, $y$, $z$ in the body of the insulation. This is illustrated schematically in Fig. 1A. In the ideal case $$v+v'=w+w'=x+x'=y+y'=z$$

According to one construction of the present invention, shown in Fig. 2 and illustrated schematically in Fig. 2A the partial capacity $(v)$ is defined as that set up between a conducting screen 2' at conductor potential and the outer intersheath 2². This partial capacity $(v)$ is increased in value by connection at joints to two equalising capacities $(v')$ and $(v^2)$ formed by inserting an inner intersheath 2 in the insulation 3 between the conductor 1 and the aforesaid screen 2'. It is shown that the increase in capacity of $(v)$ will tend to reduce the maximum stress at the screen 2' and the conductor 1 by increasing the potential of the inner and outer intersheaths 2 and 2² which are electrically connected. The earth screen or sheath is indicated at 4. For the sake of clearness the screen 2' is shown in full lines and will be referred to as the line potential screen and the screens 2 and 2² are shown in dotted lines and will be referred to as the inner and outer intersheaths.

Fig. 3 shows a method of jointing such a cable in which arrangements are made for connecting the inner and outer intersheaths 2, 2² together and the line potential screen 2' to the conductor 1. As indicated diagrammatically in this figure the line may be made with joints alternatively of different types represented at A and 3, the joint at A providing for the connection of the line potential screen 2' to the conductor 1 by the connection 5 and the joint at B providing for the interconnection of the inner and outer intersheaths 2, 2² by the connection 6. Both types can be designed to avoid severe concentration of stress and the heavy current carried by the conductor is transmitted by a normal current connector.

Fig. 4 shows a modified arrangement of joint in which at one side of the joint C the intersheaths 2—2² are interconnected by the connection 6 as at joint B of Fig. 3, whereas on the other side the line potential screen 2' is connected to the conductor 1 as at joint A of Fig. 3.

In all cases the line potential screen and intersheaths would have to be capable of carrying charging current for the length between joints. There are no difficulties in terminating such a cable. The partial capacities may be further equalised by connection of a condenser or condensers at joints or terminations between the intersheaths and the conductor or between two intersheath systems. A convenient form of condenser is the condenser cone described in British Patent 377,311 or in our British Patent 465,883.

Figure 10B:
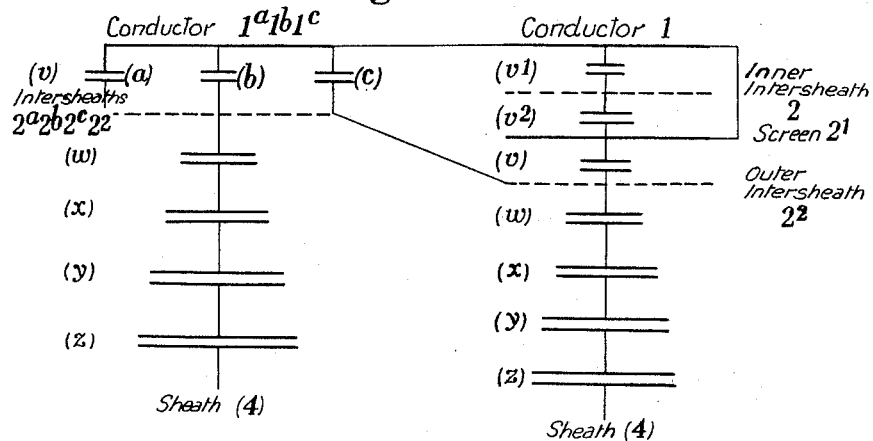
Fig. 10B is an explanatory diagram showing a combination of cables according to Figs. 2 and 6.
Figure 10C:
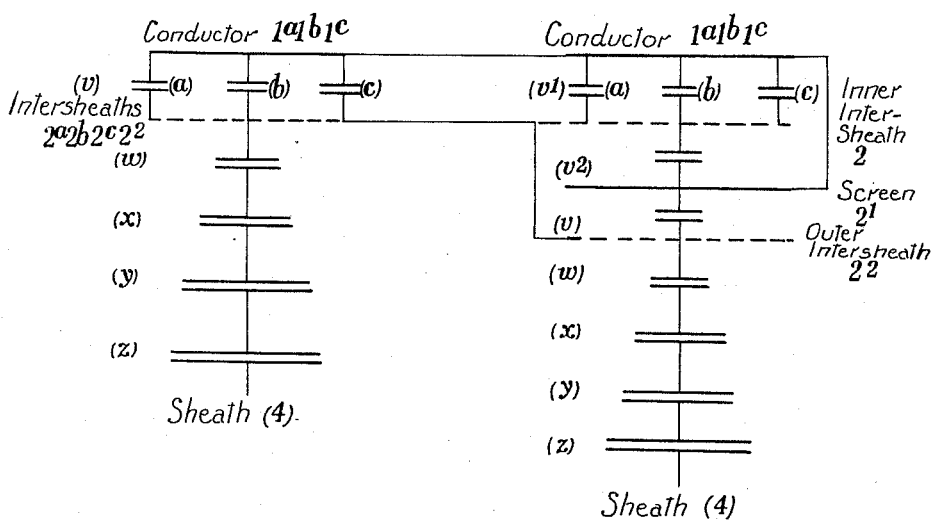
Fig. 10C is an explanatory diagram showing a combination of cables according to Figs. 6 and 7.

In general the shunted partial capacities comprised by the three inner paths 1, 2 and 2' are excessively large, with the result that some economy is lost due to the fact that they cannot be stressed up to the maximum permissible stress. This can, however, be achieved as shown in Fig. 10 by jointing in the line alternate single or multiple lengths L, L' respectively of cable to this design and cable with a suitably proportioned single intersheath. The jointing problem remains simple and it becomes possible to achieve substantially increased economies by this means. Thus the joints at D provide for the connection of the line potential screen 2' to the conductor 1 by the connection 5; the joints at E provide for the interconnection of the inner and outer intersheaths 2, 2² by the connection 6 and also at the same time with the single intersheath 2¹³ belonging to the cable lengths L' and the joint at F is a simple joint providing for the interconnection of the intersheath 2¹³ in two lengths L' of cable.

Figure 6:
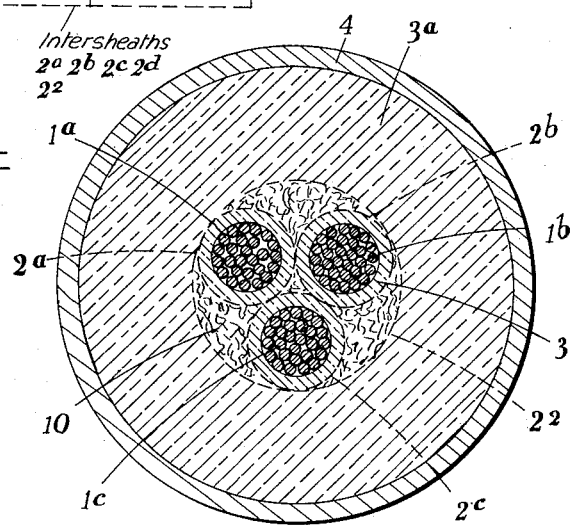
Fig. 6 is a cross section of a similar cable according to the invention with the conductor in three sections.
Figure 7:
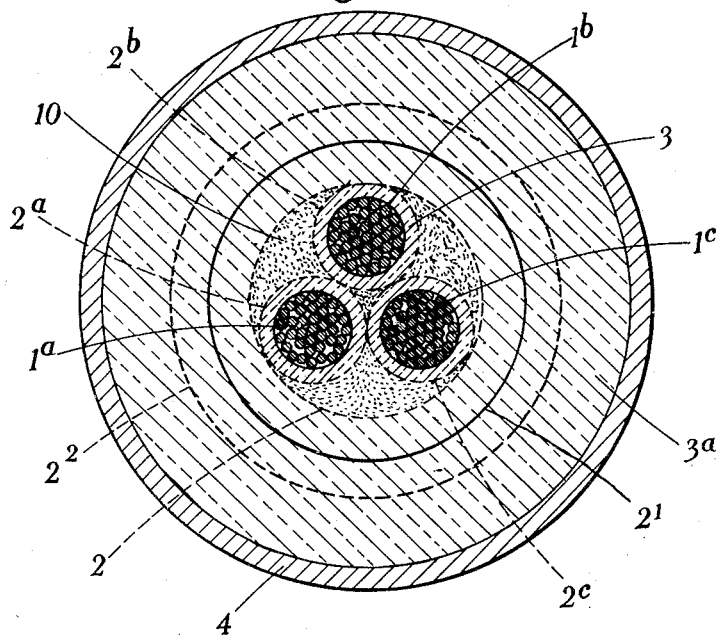
Fig. 7 is a cross section of a modified construction of single phase cable according to the invention.

It should be noted that here again the requisite charging current must be transferred from the one cable length to its neighbour, but since the intersheath system is tied down continuously throughout the length of the line, small discrepancies in the equality of the individual jointed lengths are unimportant; this is a valuable practical consideration. The arrangement of the composite cable will be better understood from a consideration of the diagram Fig. 10A. Alternative combinations of cable lengths according to Figs. 2 and 6 and Figs. 7 and 6 are illustrated diagrammatically in Figs. 10B and 10C respectively. The constructional details of the cables thus diagrammatically represented will be hereinafter described.

Figure 5:
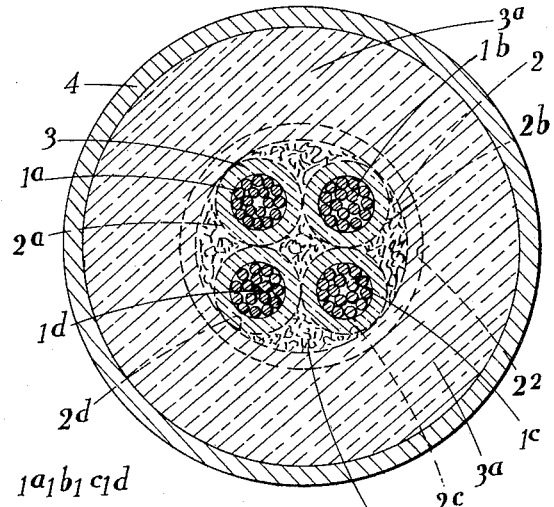
Fig. 5 is a cross section of a single phase cable according to the invention with the conductor divided into four sections.
Figure 5A:
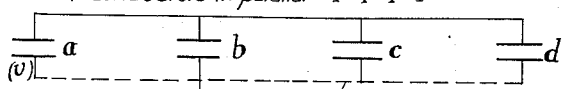
Fig. 5A is an explanatory diagram thereof.

An alternative arrangement according to the invention is shown in Fig. 5 and is illustrated schematically in Fig. 5A. In this arrangement the value of the partial capacity $(v)$ is raised without the introduction of a screen at conductor potential by dividing the conductor up into several subconductors $1a$, $1b$, $1c$, $1d$ each lapped with insulation $3$ and each surrounded concentrically by its own inner intersheath $2a$, $2b$, $2c$, $2d$. If the subconductors $1a$, $1b$, $1c$, $1d$ thus made are laid up together in the fashion normally adopted for a multicore cable and are bound together by a conducting wrapping $2$ a layer of insulation may be applied overall to separate the conducting wrapping from the outer intersheath $2^2$ which is at the same potential. The application of a belt of insulation $3a$ overall will produce a cable the insulation of which is graded in respect of electrostatic stress. Unless, however, it is desired to insert in the insulation between $2$ and $2^2$ a conducting screen or a further intersheath as hereinafter described it will be more economical to omit the insulation between $2$ and $2^2$ so that $2$ and $2^2$ become electrically and physically connected. For example, Fig. 6 illustrates this case for three sub-conductors since the invention is obviously not limited to four divisions of conductor but may be carried out by dividing the conductor into any convenient number of parts. Similarly the insulation thickness of the sub-conductors may for economic reasons be reduced with resultant increase of capacity value of $(v)$ and reduction of potential drop across $(v)$. The cable illustrated in Fig. 5 is diagrammatically represented in Fig. 5A which will be self-explanatory. If the circular conductor area is divided into four equal circular parts each sub-conductor will have a circumference one-half of the original conductor. The aggregated circumference of the conductor arrangement will therefore now equal twice the original circumference. For equal radial thickness of insulation between conductor and inner intersheath the electrostatic capacity value will be doubled. The introduction of the four partial capacities $(a)$, $(b)$, $(c)$, $(d)$ in parallel in place of the partial capacity $(v)$ has therefore resulted in doubling the value of $(v)$ and in correspondingly reducing the maximum electrostatic stress.

As indicated at $10$ in Figures 5 and 6 the interstices between the insulated and screened sub-conductors are filled with fibrous insulating material. This arrangement has the particular merit that it introduces multi-core construction principles into single core design and eliminates the necessity of the line potential screen. It is known that multi-core cables of the Hochstadter type, such for example as described in British Patent No. 7,766 of 1914, have far better service performance than single core cables. This is believed to be due to the presence of the filler or worming spaces which provide capillary reservoirs, outside the electric field, thereby increasing the stability of the cable under heating and cooling cycles caused by load fluctuations.

With this construction according to the invention an appreciable economy is effected in the utilisation of the insulating material so that not only are dimensions reduced for given maximum stress conditions, but also the multi-core construction permits the formation of capillary reservoirs within the interior of the dielectric. Moreover the thermal resistance of the cable is reduced in proportion to the reduction in overall dimensions and also by reason of the eccentric location of the cores.

The splitting of phase conductors provides facilities for "split conductor" protection and would permit the independent tripping of each section of the conductor of assumed resistance R, under thermostatic control. For example in the case of a phase divided into three sections the total resistance of the phase would be R/3. This can be successively increased to R/2 and R, by tripping out the sections of the conductor with consequent reduction of the drop in temperature as the current falls off. This eases the conditions of working of the dielectric in oil-impregnated cable since rapid cooling may thereby be avoided.

In tripping out each section provision should be made to maintain potential on each section for capacity grading purposes. This can be done by shunting the tripping switch with a resistance of relatively high order, e. g. 20 to 200 times the line resistance. Alternatively in one or more sections a resistance of negative temperature coefficient may be inserted.

The system of interstices shown in Fig. 6 furthermore obviates transfer of charging current along the length of the cable, since the individual capacities (provided by the plurality of conductors) are continuously bonded on the intersheath system.

An extension of the principle covers also the use of a multiplicity of such elements each complete with its belt and outer screen which may be laid up to form a second intersheath or one of higher order, and further provided with its own belt.

Thus Fig. 7 illustrates an embodiment of the invention which is in effect a combination of the arrangements shown in Fig. 2 and Fig. 5, but with three sub-conductors. The arrangement will be better understood from the theoretical diagram Fig. 7A when considered in conjunction with Figs. 2A and 5A. In this case the equalising condenser $(v')$ is constituted by the partial equalising condensers $(a)$, $(b)$, $(c)$ so that $(v')$ is increased in value as hereinbefore described.

Figure 8:
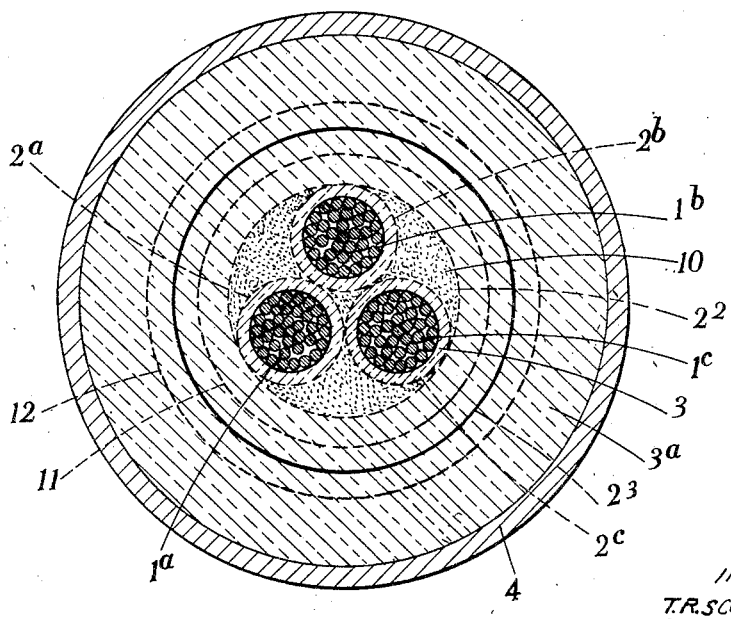
Fig. 8 is a cross section of a further modified construction of cable according to the invention.

Fig. 8 illustrates a further modification in which the partial capacity $(v)$ is equalised by the method illustrated in Fig. 6 and the partial capacity $(w)$ is then equalised by the insertion of additional intersheaths as follows. In this case intersheath $2^2$ is separated from the equipotential screen $2^3$ by a layer of insulation in which is embedded a further intersheath $11$ and in the belt of insulation surrounding $2^3$ a further intersheath $12$ is provided. Intersheath $2^2$ and screen $2^3$ are electrically connected at joints by the methods hereinbefore described to be at the same potential and the intersheaths $11$ and $12$ are similarly interconnected. Reference to the diagram Fig. 8A indicates the arrangement of the capacities.

Fig. 9 shows the application of the principles of the present invention to an oval cable with compensating arrangements according to our British Patent 451,239. The single phase conductor is constituted by the cores 1a and 1b and the compensating device is shown at 13. Combinations as hereinbefore described can obviously be applied also to this type of cable.

It may be noted that the arrangements according to the invention are applicable to all types of cable including oil-filled cables, "solid type", extruded dielectric (including graded permittivity types) gas pressure cables, etc. Similarly combinations of these types may be used for belt and core in which the individual characteristics of the types are adapted to the particular circumstances. For example the centre cores may be constructed as reinforced lead sheathed gas-pressure cable which are further reinforced hydraulically by the belt insulation which may be of the ordinary oil-impregnated (solid cable) type. In such a case a more favourable gas-pressure/diameter relationship can be obtained for any given voltage.

The introduction of the intersheath principle to joints and terminations should result in an improvement of characteristics.

It is possible to combine reservoir cable principles with any of the above arrangements. With the multi-core construction there is an optimum size of core for any given insulation diameter so that the formation of a capillary reservoir round the core for example as shown in British Patents 340,303 and 355,291 provides an advantageous method of building up the core to the optimum size. Also the screens and intersheaths in the body of insulation may with advantage be made up as capillary reservoirs.

It will be understood that the above described examples are given by way of example only and various modifications may be made within the scope of the invention.

What is claimed is:

1. A high tension cable system comprising a first and a second length, the first length having between the conductor and the cable sheath two spaced inner sheaths and a screen positioned between said sheaths, and the second length having a single inner sheath positioned between the conductor and the cable sheath, the single inner sheath of said length last mentioned being electrically connected to the two inner sheaths of said first mentioned length at the joint between said cable lengths and said screen being electrically connected to said conductor.

2. A high tension cable system comprising a first cable length having a conductor, a sheath, a first and a second inner sheath surrounding said conductor and insulated therefrom, a screen between said sheaths and insulated therefrom, a second cable length having a conductor divided into a plurality of parts, an inner sheath surrounding each of said parts and a second inner sheath surrounding all said parts and contacting electrically with the individual sheaths thereof, said lengths of cable being connected together at a joint so that said conductors and said sheaths respectively are joined, and said screen being connected to said conductors at said joint.

3. A high tension cable comprising a conductor having a plurality of parts surrounded by insulation, an individual sheath for each part, an inner sheath surrounding all of said parts and serving electrically to connect said individual sheaths, insulation around said inner sheath, an outer sheath around said insulation, a screen in the insulation between said inner and outer sheaths and means for connecting said screen to said conductor.

THOMAS ROBERTSON SCOTT.
RAYMOND CHARLES MILDNER.